United States Patent [19]

Takeda et al.

[11] Patent Number: 5,010,538
[45] Date of Patent: Apr. 23, 1991

[54] FOCUS SERVO APPARATUS

[75] Inventors: Takayuki Takeda; Masayasu Satoh, both of Tokyo, Japan

[73] Assignee: Oki Electric Industry Co., Ltd., Tokyo, Japan

[21] Appl. No.: 197,263

[22] Filed: May 23, 1988

[30] Foreign Application Priority Data

| May 25, 1987 | [JP] | Japan | 62-127624 |
| May 25, 1987 | [JP] | Japan | 62-127625 |
| May 25, 1987 | [JP] | Japan | 62-127626 |

[51] Int. Cl.⁵ ............................................. G11B 7/00
[52] U.S. Cl. ........................... 369/44.36; 369/44.29
[58] Field of Search .............. 369/32, 43–46, 369/54, 58, 41.11, 44.27, 44.29, 44.35, 44.36

[56] References Cited

U.S. PATENT DOCUMENTS

| 4,286,147 | 8/1981 | Tsuboi et al. | 369/45 X |
| 4,544,837 | 10/1985 | Tanaka et al. | 369/45 |
| 4,634,853 | 1/1987 | Kanamaru | 369/44 X |
| 4,773,052 | 9/1988 | Sugiura et al. | 369/45 X |
| 4,819,220 | 4/1989 | Miyazaki et al. | 369/45 X |
| 4,823,330 | 4/1989 | Arter et al. | 369/45 |

FOREIGN PATENT DOCUMENTS

| 171034 | 9/1984 | Japan . |
| 206928 | 9/1986 | Japan . |
| 14331 | 1/1987 | Japan . |
| 629 | 5/1988 | Japan . |
| 38855 | 8/1988 | Japan . |

Primary Examiner—Robert L. Richardson
Attorney, Agent, or Firm—Spencer & Frank

[57] ABSTRACT

In a focus servo apparatus for moving an objective lens in an optical disk drive from a distant position toward the surface of the disk and maintaining the lens in the correct focus position by means of a servo loop having a lead-in detection circuit for generating an acquisition signal when the objective lens is within the controllable range and a servo loop switch for closing the servo loop in response to the acquisition signal, a lead-in circuit generates a drive signal to move the objective lens into this range before the servo loop is closed. The drive signal rises to an initial peak, then falls back to a lower level. A bias signal is added to the drive signal when the optical disk drive is horizontally mounted. This apparatus overcomes problems caused by friction and the weight of the objective lens.

28 Claims, 10 Drawing Sheets

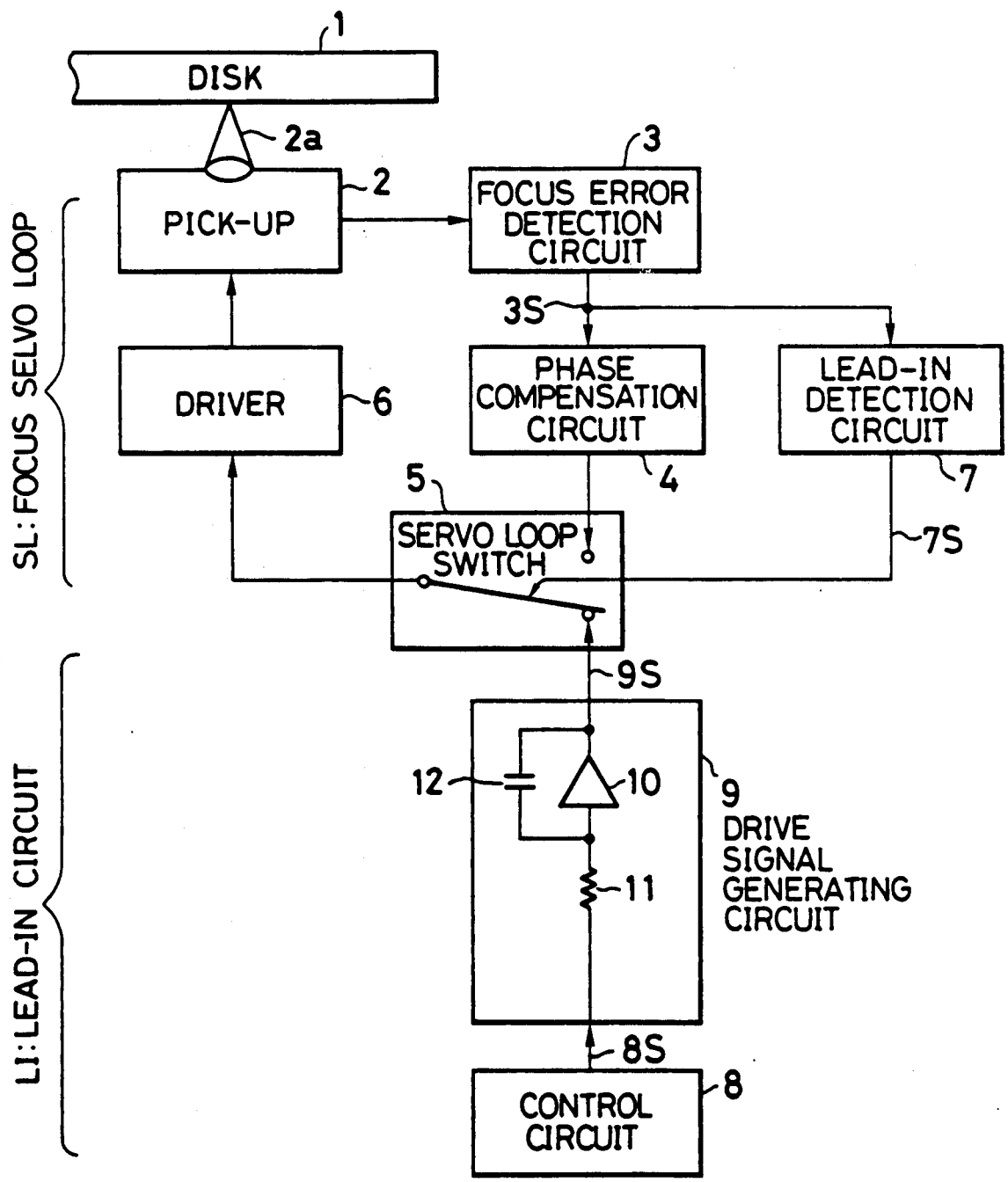

FIG.12
PRIOR ART
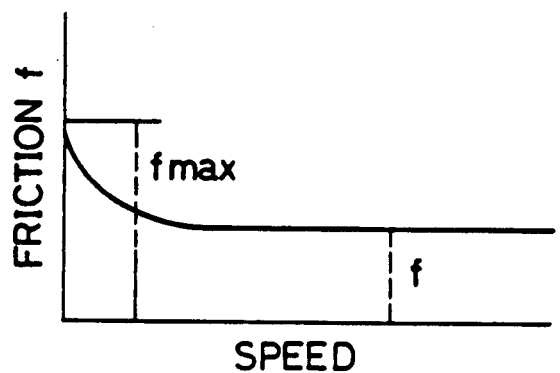
FIG.13A
PRIOR ART
FIG.13B
PRIOR ART
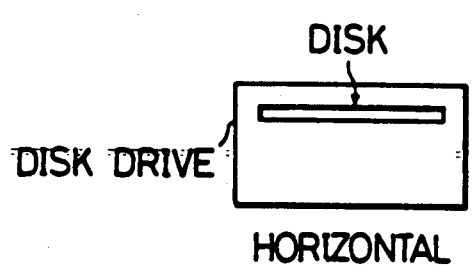
HORIZONTAL
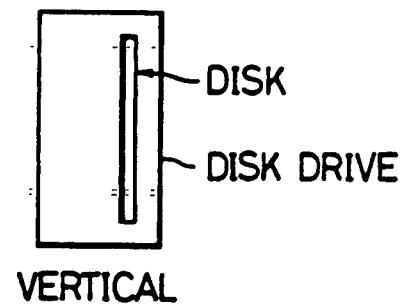
VERTICAL

FOCUS SERVO APPARATUS

BACKGROUND OF THE INVENTION

This invention relates to a focus servo apparatus for automatic focus control of the pick-up of a device such as an optical disk drive.

In an optical disk drive, a focus servo apparatus is used to maintain a constant distance between an objective lens in the pick-up and the surface of the disk, so that the objective lens will focus a laser beam accurately onto the information-carrying surface of the disk. The focus servo apparatus includes an automatic control loop called a servo loop. Before the servo loop can operate, the object lens must be within a certain controllable range, called the lead-in range. Accordingly, when the drive begins to operate, the focus servo apparatus must first move the objective lens into the lead-in range; then the servo loop can take over, move the objective lens to the correct-focus position, and maintain it in that position.

Focus servo apparatus of this type has been disclosed in Japanese Patent Applications Laid-open No. 1984/171034, 1985/629, and 1986/206928. The structure of these devices will be described with reference to the block diagram in FIG. 9.

In FIG. 9, the disk 1 comprises a substrate of a material such as glass or plastic overlain by an information-carrying medium. The pick-up 2 comprises an objective lens 2a, as well as a semiconductor laser, a photodetector, other optical components, and an actuator which are not shown. The pick-up 2 is connected to a servo loop SL and a lead-in circuit LI.

In the servo loop SL, a focus error detector 3 receives the output from the photodetector in the pick-up 2, detects deviation from the correctly focused state, and generates a focus error signal 3S. The focus error signal 3S is fed through a phase compensation circuit 4 and a servo loop switch 5 to a driver circuit 6. The purpose of the phase compensation circuit 4 is to stabilize the operation of the servo loop. The driver circuit 6 drives the actuator in the pick-up 2, causing it to move the objective lens in a direction substantially perpendicular to the disk 1. The servo loop SL is designed to move the objective lens 2a in such a way as to reduce the focus error to zero. It thus causes the objective lens 2a to follow variations in the height of the disk surface and maintain a constant distance from the disk 1.

The focus error signal 3S is also supplied to a lead-in detection circuit 7, which determines whether the objective lens 2a is within the lead-in range. The lead-in detection circuit 7 generates an acquisition signal 7S that drives the servo loop switch 5 to close the servo loop when the objective lens 2a is within the lead-in range. When closed, the servo loop SL operates as described above to maintain the objective lens 2a at the correct distance from the disk surface.

When the objective lens 2a is not within the lead-in range, the signal 7S from the lead-in detection circuit 7 places the servo loop switch 5 in a state in which the servo loop is opened and does not control the movement of the objective lens 2a. In this state the driver 6 is connected through the servo loop switch 5 to the focus servo lead-in circuit LI.

The function of the servo lead-in circuit LI connected to the servo loop switch 5 is to bring the objective lens 2a into the lead-in range when the disk drive starts to operate. The servo lead-in circuit LI comprises a control circuit 8, and a drive signal generating circuit 9 connected between the control circuit 8 and the servo loop switch 5. The control circuit 8 generates a lead-in signal 8S, from which the drive signal generating circuit 9 generates a drive signal 9S for driving the objective lens. The drive signal generating circuit 9 is an integrating circuit comprising an amplifier 10, a resistor 11, and a capacitor 12.

The lead-in operation of the focus servo apparatus in FIG. 9 will be explained with reference to FIG. 10 and FIG. 11. FIG. 10 indicates how the focus error signal 3S in FIG. 9 depends on distance from the disk. FIG. 11 is a timing chart of the lead-in operation.

The lead-in range is the range between the maximum and minimum values of the focus error signal 3S in FIG. 10. In general, the lead-in range is quite narrow, on the order of 10 $\mu$m to 20 $\mu$m. When the disk drive starts operating the objective lens 2a is distant from the disk surface and outside the lead-in range, so the servo loop switch 5 is in the state in which servo loop is open and the driver circuit 6 is connected to the lead-in circuit. As indicated in FIG. 11, the control circuit 8 sends a lead-in signal 8S to the drive signal generating circuit 9, causing it to generate a drive signal 9S which is routed by the servo loop switch 5 to the driver circuit 6. In response, the driver circuit 6 begins driving the objective lens 2a toward the surface of the disk 1. When the lead-in detection circuit 7 detects that the distance between the disk 1 and the objective lens 2a is within the lead-in range indicated in FIG. 10, it generates an acquisition signal 7S which causes the servo loop switch 5 to disconnect the driver circuit 6 from the lead-in circuit LI and close the servo loop. The servo loop then brings the objective lens 2a to the in-focus position marked 0 in FIG. 10 and maintains it there as already described, following variations in the height of the surface of the disk 1.

The configuration of the drive signal generating circuit 9 in FIG. 9 is that shown in Japanese Patent Application Laid-open No. 1985/629 or 1986/206928. Because this circuit integrates the lead-in signal 8S, the drive signal 9S increases in magnitude with time. The reason for the use of this type of circuit is that in the prior art the objective lens actuator is supported by or interacts with a spring which resists the movement of the objective lens with a force that increase in proportion to the distance from the initial position. The increasing magnitude of the drive signal 9S balances the increasing resistance of the spring to drive the objective lens at a substantially constant speed. To ensure that the speed does not become excessive, the time constant of the drive signal generating circuit 9 is fairly large. Depending on this time constant and the strength of the spring, however, the objective lens 2a may acquire such a high speed that a large transient response occurs when the focus servo loop is closed. If this response moves the objective lens 2a back outside the lead-in range, the lead-in operation fails. To overcome this problem and stabilize the servo lead-in operation, the lead-in circuit of Japanese Patent Laid-open No. 1984/171034 included a means of switching the integrating time constant.

Because the focus servo apparatus of the prior art was designed as described above, two problems occur if, as in the inventor's previous Japanese Patent Application No. 1985/152381, the objective lens actuator has a sliding support and does not interact with a spring. The first problem is that without a spring to counteract the increasing drive signal 9S, the objective lens 2a gradually accelerates, which increases the likelihood that the lead-in operation will fail.

The second problem is that the sliding support generates a friction force f. As shown in FIG. 12, this friction force has a high initial value fmax. If the driving force does not initially exceed the initial fmax, the objective lens 2a at first does not move; then when the driving force increases sufficiently to overcome fmax and the objective lens does begin to move, the friction f decreases. The result is a sudden, rapid acceleration of the objective lens 2a, which tends to make the lead-in operation unstable.

A further problem with the focus servo apparatus described above is that optical drive devices are mounted in both the position shown in FIG. 13A, in which the disk is horizontal, and the position shown in FIG. 13B, in which the disk is vertical. When the optical disk drive is mounted so that the disk is horizontal, if the pick-up 2 is located below the disk 1, the weight of the objective lens and the movable part of its actuator becomes an additional load that the drive signal 9S must overcome. When the optical disk drive is mounted so that the disk is vertical, the force of gravity acts at a direction substantially perpendicular to the direction of movement of the objective lens and actuator, so their weight is absorbed by the actuator support and does not act as a load to the actuator. To provide for these different mounting orientations, it is therefore necessary to change the magnitude of the drive signal 9S, which detracts from the convenience of use of the drive. Moreover, in the horizontal orientation a steady-state error persists during the focus following operation even after the lead-in operation is completed.

SUMMARY OF THE INVENTION

This invention is directed toward a focus servo apparatus for an optical disk drive, for moving an objective lens from a distant position toward the surface of the disk and maintaining the lens in the correct position to focus a beam of light onto the surface of the disk, that solves the problems of unstable operation due to friction when the objective lens has a sliding support and due to the weight of the objective lens and its actuator when the disk drive is mounted with the disk horizontal by providing:

a servo loop for maintaining the objective lens at the position of correct focus, having a lead-in detection circuit for generating an acquisition signal when the objective lens has been moved into the range in which it can be controlled by the servo loop, and a servo loop switch for closing the servo loop in response to the acquisition signal; and a lead-in circuit connected to the servo loop switch, for generating a drive signal to move the objective lens into this range before the servo loop is closed, in which the drive signal rises to an initial peak, then falls back to a lower level.

BRIEF DESCRIPTION OF THE DRAWINGS

In the accompanying drawings:

FIG. 9 is a block diagram of a prior art focus servo apparatus.

FIG. 12 is a chart of the friction characteristic when the objective lens and its actuator have a sliding support.

FIG. 13A and 13B illustrate the horizontal and vertical orientations of a disk drive.

DETAILED DESCRIPTION OF THE PREFERRED EMBODIMENTS

Three embodiments of this invention will be described below with reference to the drawings.

Figure 1:
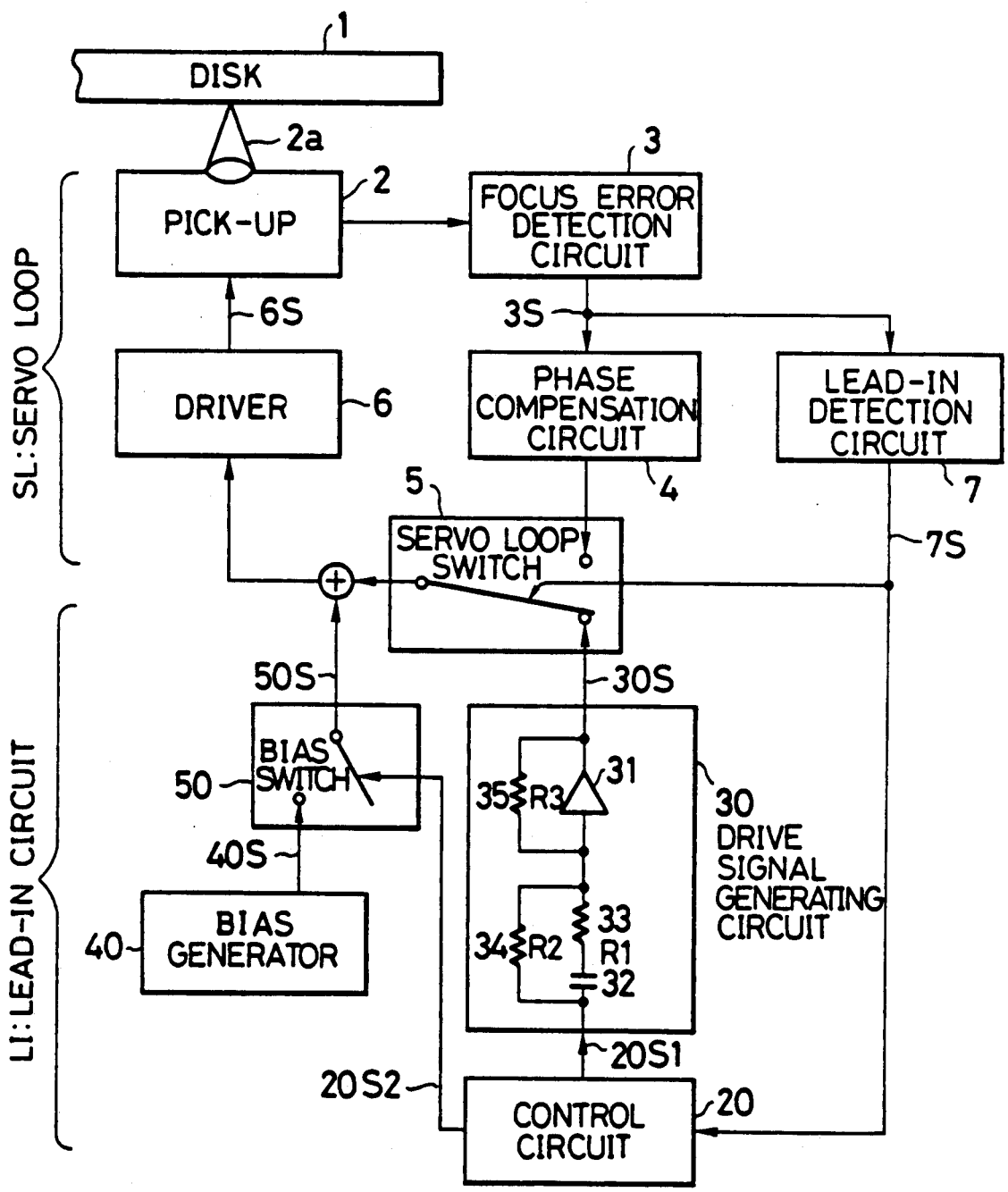
FIG. 1 is a block diagram of a first embodiment of the present invention.

FIG. 1 is a block diagram of a focus servo apparatus illustrating a first embodiment of this invention. Components identical to those of the prior art discussed above with reference to FIG. 9 are labeled with the same numbers.

The servo loop SL is identical to that in the prior art, comprising a pick-up 2, a focus error detection circuit 3, a phase compensation circuit 4, a servo loop switch 5, a driver circuit 6, and a lead-in detection circuit 7. The lead-in circuit LI of this embodiment, comprising a control circuit 20 and a drive signal generating circuit 30 connected to the focus servo loop, differs from that of the prior art. This embodiment also has a bias generator 40 and a bias switch 50 connected to a point between the servo loop switch 5 and the driver 6.

The control circuit 20, which comprises a timer and a gate circuit, is connected to the lead-in detection circuit 7 to receive the acquisition signal 7S, and to the drive signal generating circuit 30 and the bias switch 50. During the servo lead-in operation it sends a lead-in signal 20S1 to the drive signal generating circuit 30. If it does not receive an acquisition signal 7S within a fixed time t0 from the commencement of production of the lead-in signal 20S1, it also sends a bias switch signal 20S2 to the bias switch 50.

The drive signal generating circuit 30 is a differentiating circuit comprising an amplifier 31, a capacitor 32, and resistors 33, 34, and 35. It differentiates the lead-in signal 20S1 output from the control circuit 20 to generate a drive signal 30S which rises abruptly to an initial peak value, then falls back to a steady intermediate value. The drive signal 30S is sent via the servo loop switch 5 to the driver circuit 6. The capacitance C of the capacitor 32 and the resistances R1, R2, and R3 of the resistors 33, 34, and 35 are selected so that: when the initial peak output, which is determined by $R3 \times (R1+R2)/(R1 \times R2)$, is supplied to the driver circuit 6, the objective lens is driven with a force 2 to 4 times as great as the initial friction force fmax in FIG. 12; the steady intermediate output, which is determined by R3/R2, generates a driving force that is, for example, substantially equal to the sliding friction force f in FIG. 12; and the time constant is on the order of 5 ms to 20 ms.

The bias generator 40 generates a bias signal 40S that, when supplied to the driver 6, produces a force equal and opposite in direction to the force of gravity acting on the objective lens 2a and the movable part of its actuator, which is not shown in the drawing. The output of this circuit is connected to the input of the driver circuit 6 through the bias switch 50. The bias switch 50 is shown in FIG. 1 in the off state; it changes to the on state when it receives the bias switch signal 20S2 from the control circuit 20.

Figure 2A:
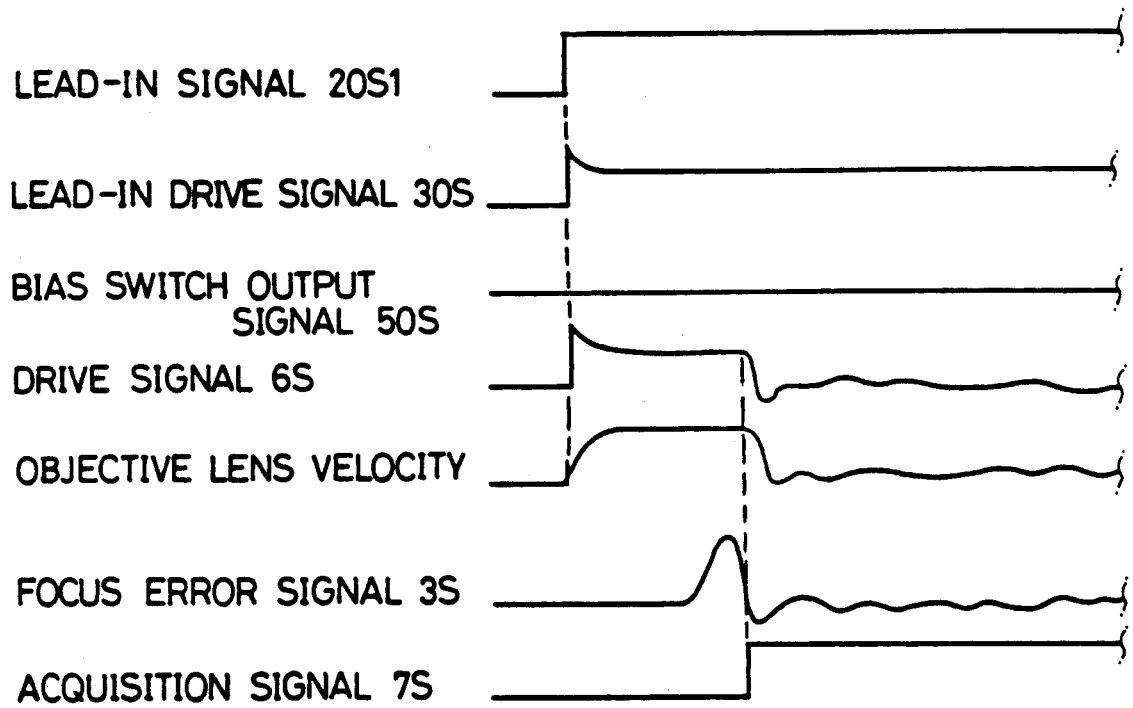
FIG. 2A and FIG. 2B are a pair of timing charts showing the operation of the device of FIG. 1 when the disk drive is mounted vertically and horizontally.
Figure 2B:
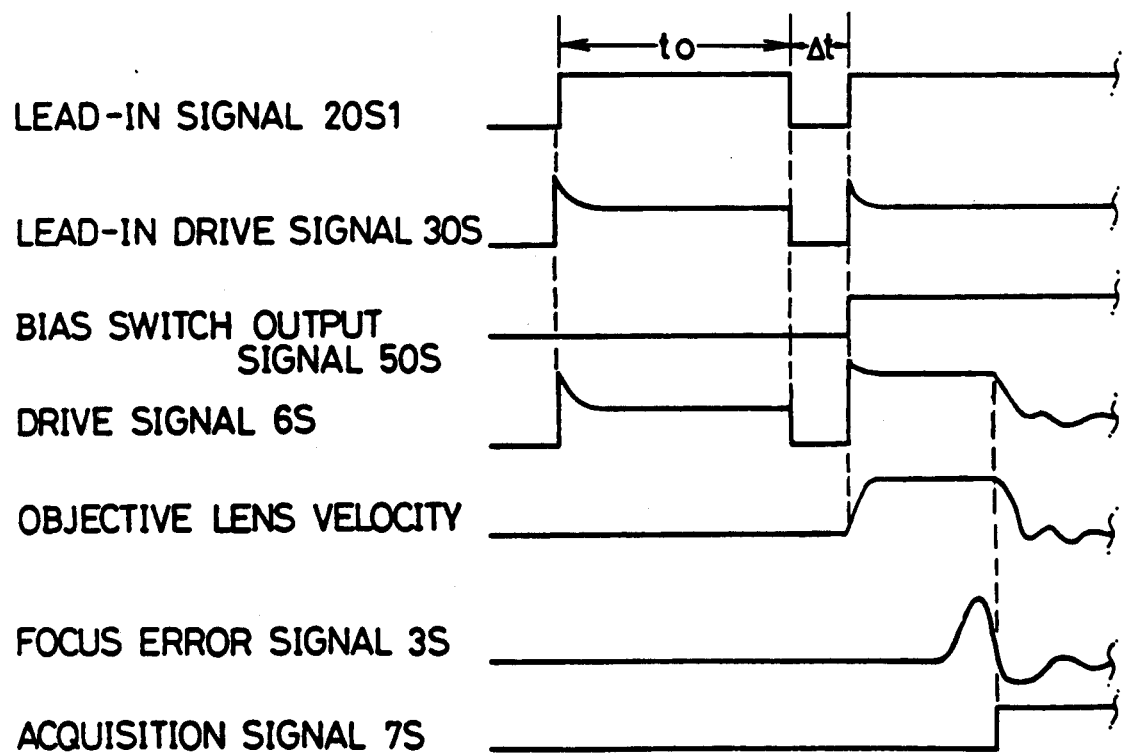
Figure 10:
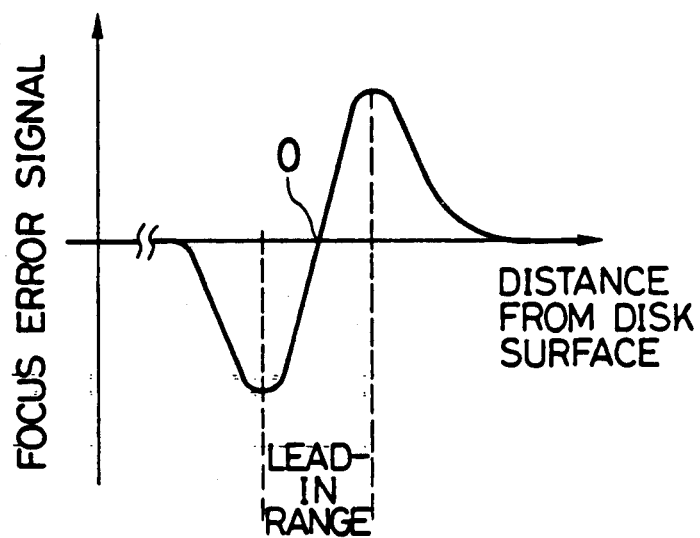
FIG. 10 is a chart of the focus error signal in FIG. 9, illustrating the lead-in range.
Figure 11:
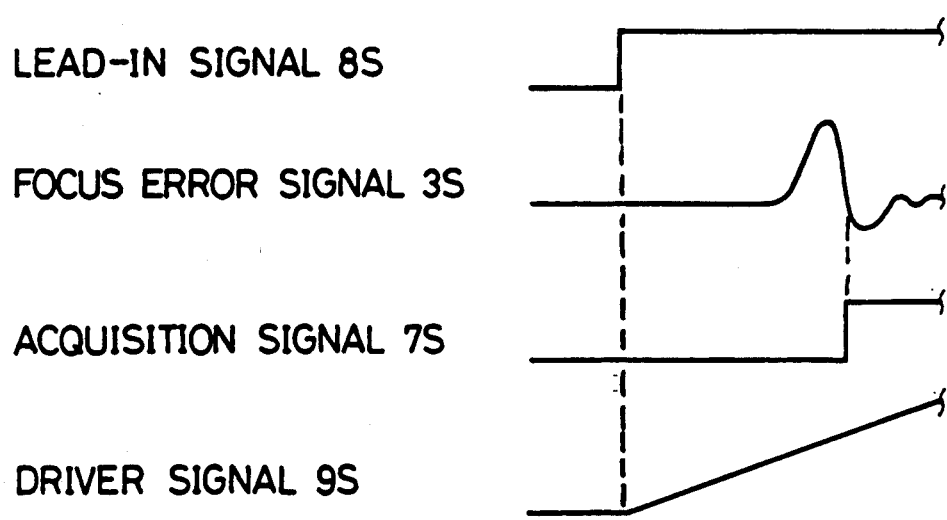
FIG. 11 is a timing chart illustrating the operation of FIG. 9.

The operation of FIG. 1 is explained below with reference to the timing charts of the focus lead-in operation in FIG. 2A and 2B. The timing chart in FIG. 2A is for the case in which the optical disk drive is mounted vertically. Initially, the bias switch 50 is in the off state and the servo loop switch 5 is set so that the servo loop is open and the driver circuit 6 is connected to the drive signal generating circuit 30. To start the lead-in operation, the output signal from control circuit 20 changes digital states (from the low state to the high state in this example) to provide a High-level lead-in signal 20S1. The lead-in signal 20S1 is differentiated by the drive signal generating circuit 30 and supplied as the drive signal 30S through the servo loop switch 5 to the driver circuit 6, causing the driver circuit 6 to move the objective lens 2a toward the disk 1. Since the parameters of the drive signal generating circuit 30 are set as described earlier, the objective lens 2a accelerates only for the first few tens of milliseconds; after that it moves at a nearly constant speed. When the objective lens 2a nears the disk 1 and the focus error signal 3S enters the lead-in range around the correct-focus point 0 in FIG. 10, the lead-in detection circuit 7 generates an acquisition signal 7S, causing the servo loop switch 5 to disconnect the driver 6 from the drive signal generating circuit 30 and connect it to the phase correction circuit 4, closing the focus servo loop. The focus servo loop operates as in the prior art, bringing the objective lens 2a to the correct-focus point 0 (FIG. 10) and maintaining it in that position by following variations in the height of the surface of the disk 1. Since the optical disk drive is oriented vertically, the weight of the objective lens and its actuator is absorbed by the actuator support and does not cause a steady-state error during the tracking operation.

Next, the operation when the optical disk apparatus is mounted horizontally will be explained with reference to FIG. 2B. As in FIG. 2A, in the initial state the bias switch 50 is off and the driver circuit 6 is connected to the drive signal generating circuit 30. The control circuit 20 initiates the lead-in operation by generating a High-level lead-in signal 20S1 which is differentiated by the drive signal generating circuit 30 and supplied as the drive signal 30S through the servo loop switch 5 to the driver circuit 6. Since the apparatus is mounted horizontally, however, the weight of the objective lens 2a and the movable part of its actuator acts as a load, so the objective lens 2a either does not move, or moves but does not reach the lead-in range within the time t0. When the time t0 has elapsed without reception of the acquisition signal 7S from the lead-in detection circuit 7, the control circuit 20 temporarily drops the lead-in signal 20S1 to the Low level for a time Δt, then generates a bias switch signal 20S2, placing the bias switch 50 in the on state, and resumes output of a High-level lead-in signal 20S1 to repeat the lead-in operation. Again the lead-in signal 20S1 is differentiated by the drive signal generating circuit 30 and sent through the servo loop switch 5 as the drive signal 30S. In addition, since the bias switch is now on, the bias signal 40S output from the bias generator 40 is sent through the bias switch 50 and added to the drive signal 30S, and the sum of these signals is supplied to the driver circuit 6. In this sum, the bias signal 40S cancels the effect of the weight of the objective lens 2a and the movable part of its actuator, so the drive signal 30S drives the objective lens 2a toward the disk 1 at the same speed as when the optical disk drive is vertically mounted. Thus the objective lens reaches the lead-in range and he lead-in detection circuit 7 generates an acquisition signal 7S, causing the servo loop switch 5 to close the servo loop and begin the focus following operation. In the focus following operation, the bias switch 50 remains in the on state and the bias signal 40S is supplied to the driver circuit 6 to continue canceling the effect of the weight of the objective lens 2a and the movable part of its actuator. This eliminates the steady-state error that occurred in the prior art.

The interval t0 during which the lead-in signal 20S1 is High must be set long enough (on the order of 200 ms to 500 ms, for example) to allow the objective lens 2a to reach the lead-in range from its initial position regardless of the exact distance from the initial position to the correct-focus point. The time Δt during which the lead-in signal 20S1 temporarily goes Low must be long enough to allow the drive signal generating circuit 30 to recover to its original state, so that the next High lead-in signal 20S1 will be differentiated properly. For example, Δt could be set to a value at least twice as long as the time constant (for the discharging or resetting operation) of the drive signal generating circuit 30.

When the objective lens actuator has a sliding support and does not interact with a spring, this embodiment provides the following advantages over the prior art:

(i) The initial peak output of the drive signal 30S is sufficient to overcome the initial friction force and reliably drive the objective lens 2a.

(ii) Since the drive signal 30S falls back from its initial peak to a steady intermediate level, the objective lens 2a is driven at a substantially constant speed, resulting in stable lead-in regardless of the distance from the initial position to the lead-in range.

(iii) When the optical disk drive is horizontally oriented, the bias signal 40S compensates for the weight of the objective lens 2a and the movable part if its actuator, improving the stability of the servo lead-in operation and eliminating the steady-state error during focus following.

A second embodiment of this invention will be described with reference to FIG. 3 through FIG. 6. This embodiment is similar to the first embodiment, but instead of detecting the horizontal orientation of the drive from the failure of the first lead-in operation, this embodiment includes means for detecting the orientation directly.

Figure 3:
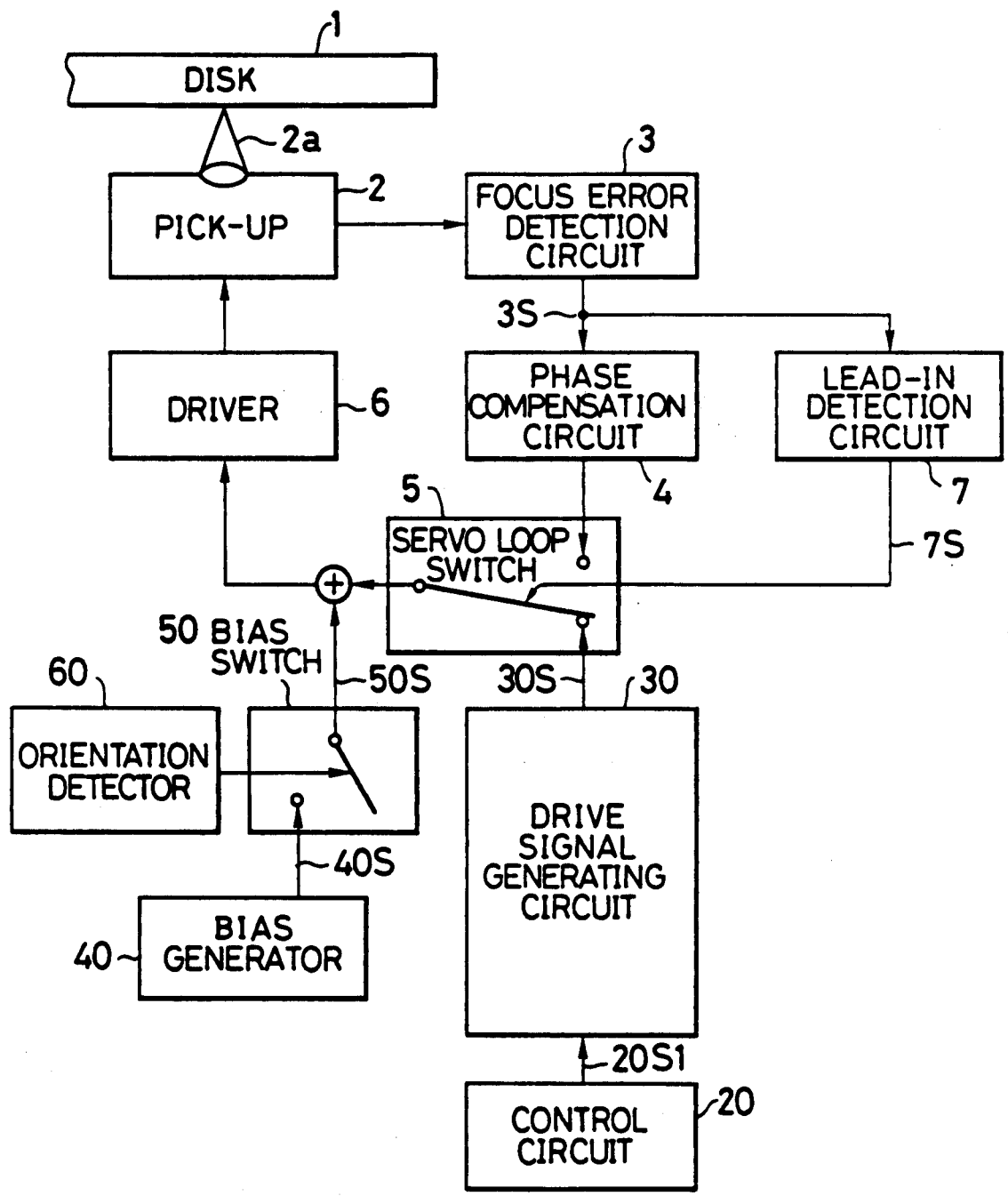
FIG. 3 is a block diagram of a second embodiment of the present invention.

FIG. 3 is a block diagram showing the configuration of this embodiment. The difference between this embodiment and the first embodiment is that this embodiment includes an orientation detecting means 60 which controls the bias switch 50 to switch the bias signal 40S on and off depending on the orientation of the optical disk drive. Since the control circuit 20 does not control the bias switch, it is not connected to the bias switch 50, does not generate a bias switch signal, and need not include a timer. Furthermore, in this embodiment it is not necessary for the control circuit 20 to be informed when the objective lens 2a reaches the lead-in range, so the control circuit 20 is not connected to the lead-in detection circuit 7.

Figure 4A:
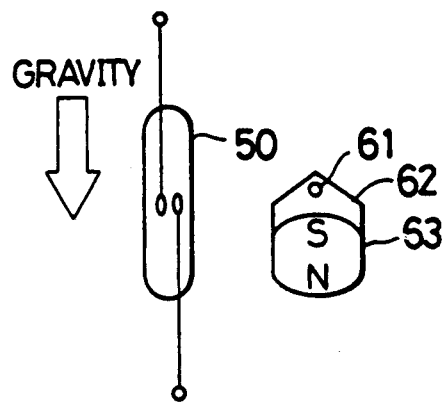
FIG. 4A and FIG. 4B show an embodiment of the orientation detecting means in FIG. 3 in the vertical and horizontal orientations.
Figure 4B:
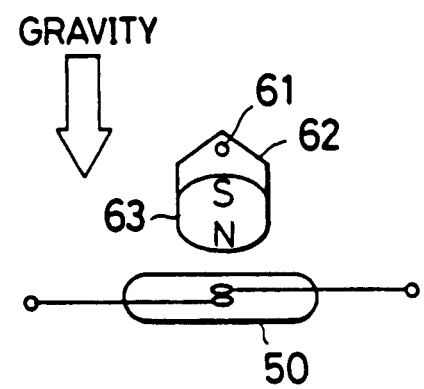

FIG. 4A and 4B illustrate one possible configuration of the bias switch 50 and the orientation detector 60. FIG. 4A shows the case in which the drive is oriented vertically; FIG. 4B shows the case in which it is oriented horizontally.

The bias switch 50 in FIG. 4A and FIG. 4B is a reed switch. The orientation detector 60 comprises a pin 61, a plate 62, and a magnet 63. The bias switch 50 and the pin 61 are attached in fixed positions to the optical disk drive. The magnet 63 is attached to the plate 62. The plate 62 is rotatably attached to the pin 61, with its center of gravity not located at the position of the pin. When the optical disk drive is mounted vertically, the force of gravity positions the magnet 63 at a distance from the bias switch 50 as in FIG. 4A, so the bias switch 50 is in the off state. When the optical disk drive is horizontally mounted, the force of gravity positions the magnet 63 close to the bias switch 50, so magnetic force generated by the magnet 63 turns the bias switch 50 on as shown in FIG. 4B.

Figure 5A:
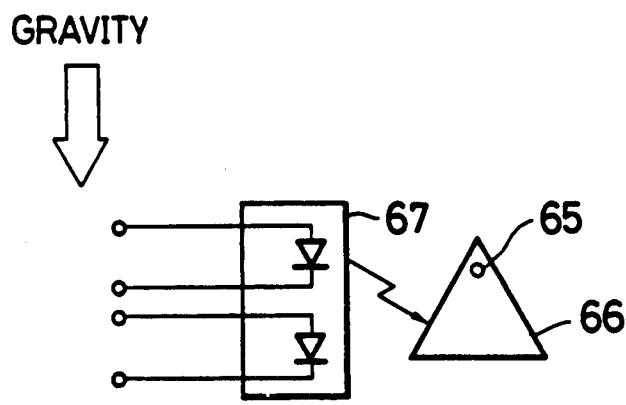
FIG. 5A and FIG. 5B show another embodiment of the orientation detecting means in FIG. 3 in the vertical and horizontal orientations.
Figure 5B:
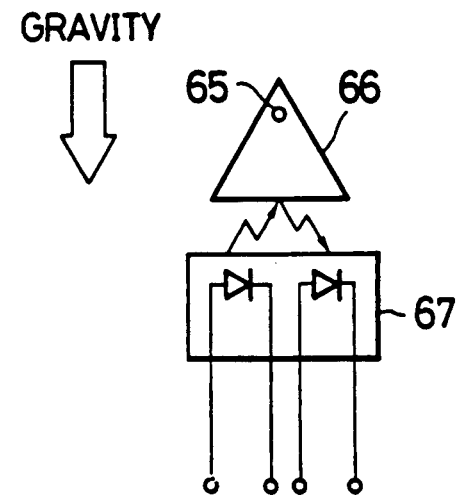

FIG. 5A and 5B illustrate another embodiment of the orientation detector 60 in FIG. 1. FIG. 5A shows the case when the device is vertical; FIG. 5B shows the case when the device is horizontal. This orientation detector 60 comprises a pin 65, a reflector plate 66, and a photoelectric device 67 with a built-in light-emitting element and photodetector. The pin 65 and the photoelectric device 67 are attached to the optical disk drive in a fixed position. The reflector plate 66 is rotatably attached to the pin 65. In this case the orientation of the optical disk drive determines whether or not light from the light-emitting element in the photoelectric device 67 is reflected back to the photodetector, thus determining the magnitude of the photodetector output signal from the photoelectric device 67. The bias switch 50 can be a device such as a transistor that can be switched on and off by the photodetector output signal.

Figure 6A:
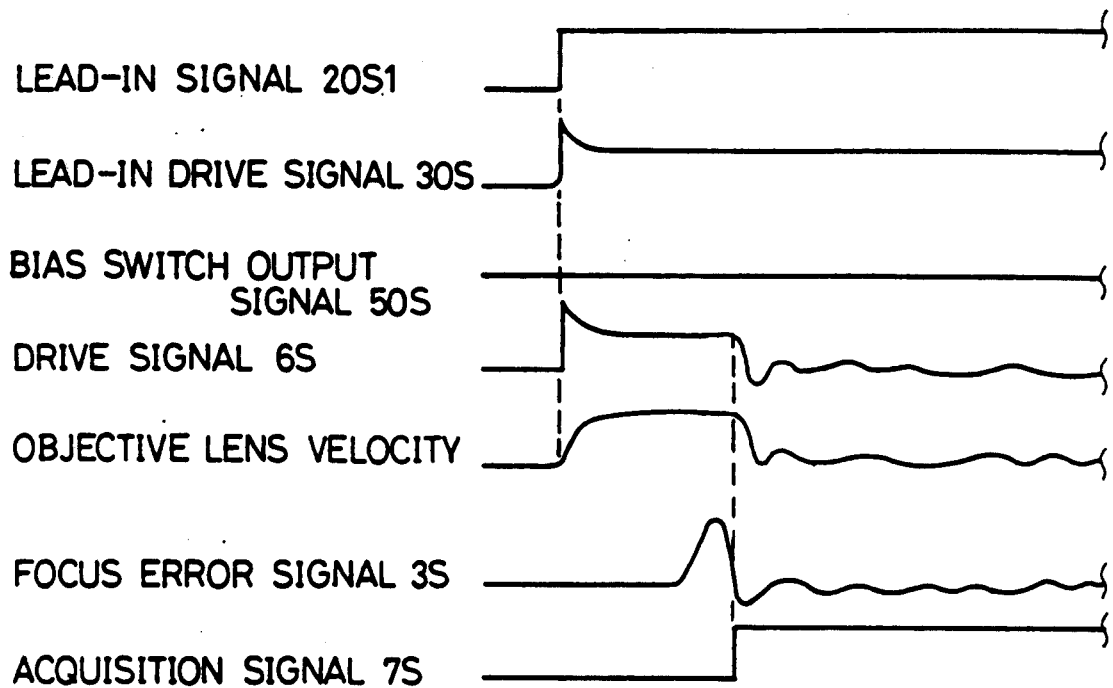
FIG. 6A and 6B are a pair of timing charts showing the operation of FIG. 3.

The operation of the device of FIG. 3 is explained below with reference to the timing charts of the focus lead-in operation in FIG. 6A and FIG. 6B. The timing chart in FIG. 6A is for the case in which the optical disk apparatus is mounted vertically. In this orientation the bias switch 50 remains in the off state. The lead-in operation begins when the control circuit 20 generates a High lead-in signal 20S1 and proceeds exactly as in FIG. 2A. The initial peak of the drive signal 30S overcomes the initial friction force; then the objective lens moves at a substantially constant speed until it reaches the lead-in range, at which point the servo loop switch 5 closes the servo loop to commence servo tracking.

Figure 6B:
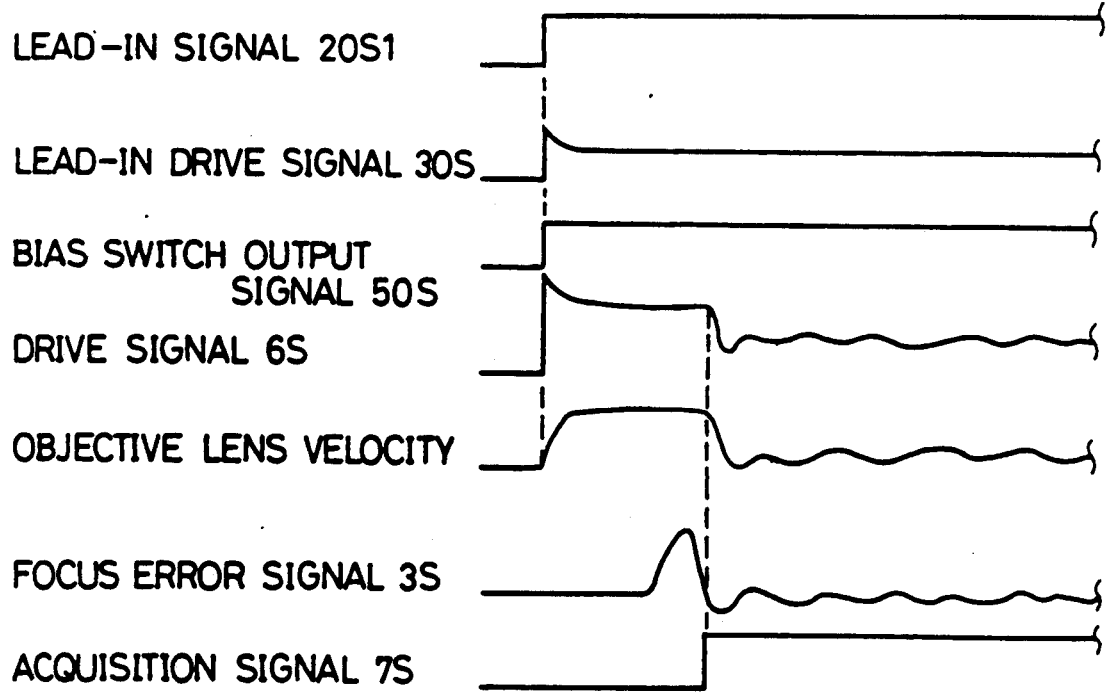

The timing chart in FIG. 6B is for the case in which the optical disk apparatus is mounted horizontally. In this orientation the bias switch 50 is in the on state, so when the control circuit 20 generates the lead-in signal 20S1, the bias signal 40S is added to the drive signal 30S, compensating for the effect of the weight of the objective lens 2a and the movable part of its actuator. The lead-in operation therefore proceeds exactly as in the vertical orientation, succeeding on the first attempt. After the objective lens reaches the lead-in range, the bias signal continues to be supplied to the driver 6, eliminating the steady-state error that was present in the prior art.

This embodiment provides the same advantages as the first embodiment. A further advantage is that even in the horizontal orientation, the lead-in operation succeeds on the first attempt. This reduces the time required for the lead-in.

Figure 7:
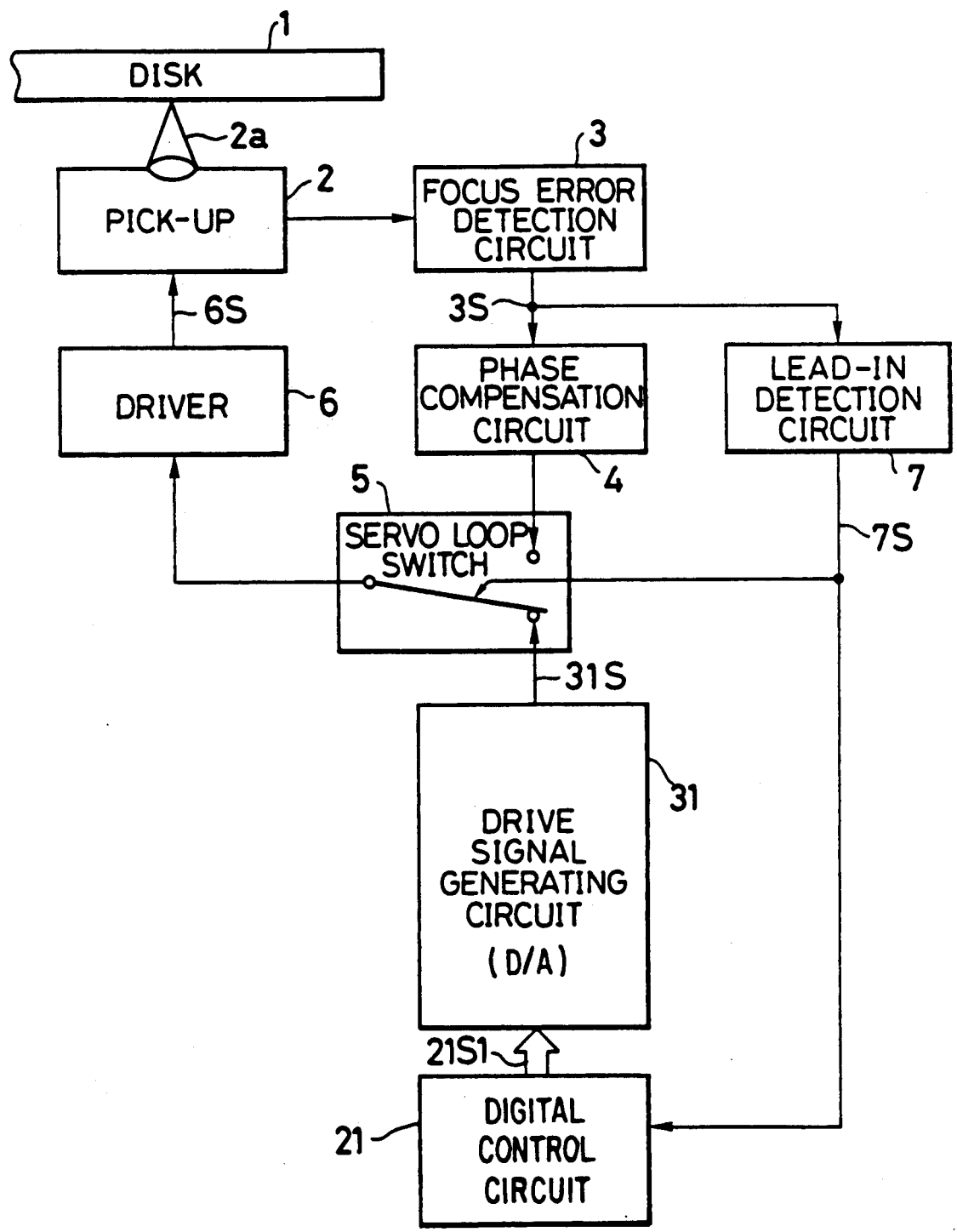
FIG. 7 is a block diagram of a third embodiment of the present invention.
Figure 8A:
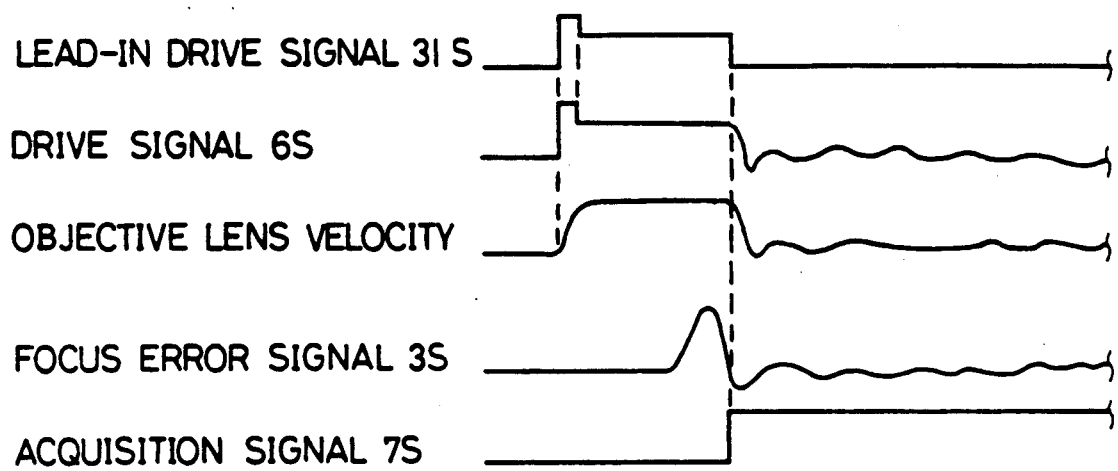
FIG. 8A and 8B are a pair of timing charts illustrating the operation of FIG. 7.
Figure 8B:
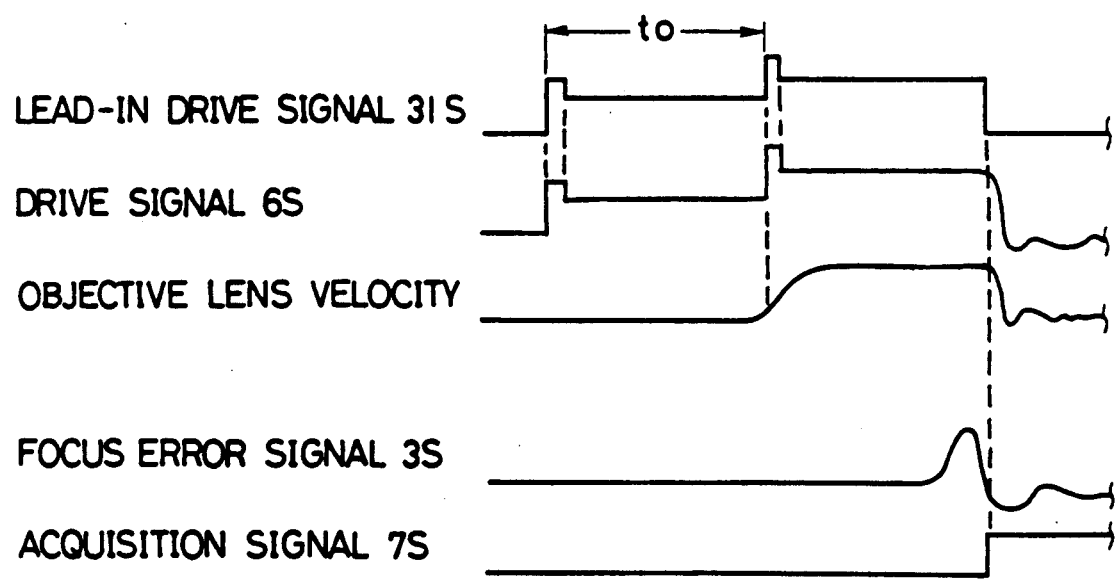

A third embodiment of this invention is shown in FIG. 7, FIG. 8A and FIG. 8B. In this embodiment, the control circuit 21 generates a binary coded digital lead-in signal 21S1 and the drive signal generator 31 is a digital-to-analog converter. The control circuit 21 is connected to the drive signal generator 31 and to the lead-in detection circuit 7. The control circuit 21 includes a timer and other components.

The operation of this embodiment is shown by the timing charts in FIGS. 8A and 8B. The timing chart in FIG. 8A is for the case in which the optical disk drive is mounted vertically. The control circuit 21 generates a digital signal that causes the digital-to-analog converter in the drive signal generator 31 to produce an initial pulse, with a magnitude of, for example, two to four times that of the initial friction force and a duration of 5 ms to 20 ms, followed by a signal substantially equal to the sliding friction force. The operation proceeds as in the first and second embodiments when the disk drive was vertically mounted. When the control circuit 21 receives the acquisition signal 7S indicating that the objective lens 2a is within the lead-in range, it drops the lead-in signal 21S1 to zero, causing output from the drive signal generator 31 to cease. At substantially the same time, the servo loop switch 5 closes the servo loop, which then moves the objective lens 2a to the correctly focused position and maintains it there.

The operation of the third embodiment in the horizontal orientation is shown in FIG. 8B. The operation starts as in FIG. 8A, but due to the additional load caused by the weight of the objective lens 2a and the movable part of its actuator, the objective lens fails to reach the lead-in range within a time t0, which is preset in the timer in the control circuit. The control circuit then increases the value of the lead-in signal 21S1, causing the digital-to-analog converter in the drive signal generator 31 to generate a new pulse with a magnitude equal to the force of this weight load plus, for example, two to four times the initial friction force, followed by a signal substantially equal to the sliding friction force plus the force of the weight load. This drive signal 31S overcomes the forces of both friction and gravity acting on the objective lens and its actuator and brings the objective lens into the lead-in range. As in FIG. 8A, when the control circuit receives the acquisition signal 7S from the lead-in detection circuit 7, it reduces its output to zero and the servo loop switch 5 closes the servo loop to begin focus following.

This embodiment differs from the first two embodiments in that when the optical disk drive is mounted horizontally, after the lead-in operation succeeds and the servo loop switch 5 disconnects the drive signal generating circuit 31 from the driver circuit 6, no bias signal is supplied to the servo loop. The servo loop itself, however, is largely capable of coping with the weight of the objective lens and its actuator. The disadvantage of the persistence of a steady-state error is offset by the advantage of a simpler circuit configuration which requires only a single digital-to-analog converter and does not require a separate bias generator and bias switch.

This invention is not restricted to the embodiments shown in the drawings; its scope includes modifications such as, for example, the following:

(a) In the first and second embodiments, the drive signal generating circuit 30 need not be an differentiating circuit but can be a digital-to-analog converter as in the third embodiment, or any other circuit capable of producing a waveform with an initial pulse followed by a substantialy constant, lower-level signal.

(b) The orientation detecting means 60 in the second embodiment can be means other than those shown in the drawings. For example, the light-reflecting arrangement shown in FIG. 5A and FIG. 5B can be replaced by a light-transmitting arrangement. It is also possible for the photoelectric device to combine the function of the bias switch 50.

(c) In the third embodiment, the drive signal generating circuit 31 need not be a digital-to-analog converter but can be, for example, a circuit comprising the differentiating circuit of the first embodiment and additional elements for adding a bias component on command from the control circuit.

(d) The drive signal 30S and the bias signal 40S can be connected to the servo loop at points other than those shown in the drawings. In the third embodiment, for example, the drive signal (1.C., 31S) can be connected to a point between the input of the driver 6 and the output of the servo loop switch 5, which can then be a simple on-off switch.

The advantages of this invention for an optical disk drive in which the objective lens actuator has a sliding support, not interacting with a spring, are summarized below.

(i) The initial peak output in the driving signal enables the objective lens to be reliably driven despite the presence of a large initial friction force.

(ii) After the initial peak output in the driving signal, an intermediate-level signal is output, so the objective lens can be driven at a substantially constant speed. As a result, stable leading-in is possible regardless of the distance to the lead-in range.

(iii) When the drive is oriented horizontally, a bias signal is added to the drive signal to cancel the effect of the weight of the objective lens and the movable part of its actuator, stabilizing the servo lead-in operation. The bias signal can also be added to the servo loop to eliminate steady-state error during focus following.

What is claimed is:

1. A focus servo apparatus for moving an objective lens from a distant position toward the surface of a disk in an optical disk drive and maintaining the lens in the correct position to focus a beam of light onto the surface of the disk, comprising:

a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquistion signal; and a lead-in circuit means connected to said servo loop, for generating a drive signal to move said objective lens into said range before said servo loop is closed, such that said drive signal abruptly rises from a first level to an initial peak at a second level, then falls to a third level that is between said first and second levels, said drive signal remaining substantially constant at said third level for a period of time greater than it took to change from said first level to said third level.

2. A focus servo apparatus according to claim 1, wherein said lead-in circuit means comprises:

a control circuit for generating a lead-in signal; and a drive signal generating circuit for receiving said lead-in signal and processing it to create said drive signal.

3. A focus servo apparatus according to claim 2, wherein said lead-in circuit means further comprises:

an orientation detecting means for detecting the mounting orientation of said disk and generating a bias switch signal that assumes one state when said orientation is substantially vertical and another state when said orientation is substantially horizontal;

a bias generator for generating a bias signal; and a bias switch for receiving said bias signal and said bias switch signal, and applying said bias signal to a point in said servo loop when said bias switch signal indicates that said orientation is substantially horizontal.

4. A focus servo apparatus according to claim 3, wherein said control circuit comprises means for timing a period having a set duration, said control circuit is connected to said lead-in detection circuit and receives said acquisition signal, and said control circuit detects said orientation according to whether said acquisition signal is received within said period having said set duration, generates said bias switch signal, and supplies said bias switch signal to said bias switch, thereby serving as said orientation detecting means.

5. A focus servo apparatus according to claim 4, wherein said control circuit further comprises means for causing said drive signal to rise abruptly again to another peak level equal to said second level plus a bias as determined by said bias signal, and then fall to a level equal to said third level plus said bias, if said acquistion signal fails to arrive within said period having said set duration.

6. A focus servo apparatus according to claim 3, wherein said orientation detecting means comprises a fixed member fixed to said optical disk drive and a rotatable member rotatably attached to said optical disk drive, said rotatable member assuming different positions relative to said optical disk drive depending on the orientation of said optical disk drive.

7. A focus servo apparatus according to claim 6, wherein said fixed member is a reed switch and said rotatable member comprises a plate rotatably mounted on a pin, and a magnet attached to said plate.

8. A focus servo apparatus according to claim 6, wherein said rotatable member is a reflecting plate rotatably mounted on a pin, and said fixed member is a photoelectric device for detecting light reflected from said reflecting plate.

9. A focus servo apparatus according to claim 2, wherein said control circuit is connected to said lead-in detection circuit, and said control circuit and said drive signal generating circuit also serve as an orientation detecting means for detecting whether said disk has a substantially horizontal orientation and means for modifying said drive signal if a substantially horizontal orientation is detected, by increasing to said drive signal if said control circuit does not receive said acquisition signal within a set time.

10. A focus servo apparatus according to claim 9, wherein said drive signal is connected to an input of said servo loop switch.

11. A focus servo apparatus according to claim 2, wherein said control circuit is connected to said lead-in detection circuit and receives said acquisition signal, and wherein said control circuit comprises means for timing a period having a set duration and, if said control circuit fails to receive said acquisition signal within said period having said set duration, for causing said drive signal generating circuit to increase the previously generated drive signal by an amount corresponding to the force of the weight load of said objective lens.

12. A focus servo apparatus according to claim 2, wherein said drive signal generating circuit is a differentiating circuit.

13. A focus servo apparatus according to claim 12, wherein said control circuit is connected to said lead-in detection circuit and receives said acquisition signal, wherein said control circuit comprises means for timing a period having a set duration and for causing said drive signal to rise abruptly again to another peak level equal to said second level plus a bias as determined by said bias signal, and then fall to a level equal to said third level plus said bias if said acquisition signal does not arrive within said period having said set duration, and wherein before causing said drive signal to rise again to another peak level, said control circuit sets said differentiating circuit.

14. A focus servo apparatus according to claim 2, wherein said control circuit is a digital circuit and said drive signal generating circuit comprises a digital-to-analog converter.

15. A focus servo apparatus according to claim 3, wherein said bias signal is applied to the output of said servo loop switch.

16. A focus servo apparatus according to claim 1, wherein said servo loop comprises a driver and feedback means.

17. A focus servo apparatus according to claim 16, wherein said feedback means comprises a focus error detection circuit and a phase correction circuit.

18. A focus servo apparatus according to claim 16, wherein said driver is connected to the output of said servo loop switch.

19. A focus servo apparatus for moving an objective lens from a distant position toward the surface of a disk in an optical disk drive and maintaining the lens in the correct position to focus a beam of light onto the surface of the disk, comprising:
a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquisition signal; and
a lead-in circuit means, connected to said servo loop, for generating a drive signal to move said objective lens into said range before said servo loop is closed, said drive signal rising from a first level to an initial peak at a second level and then falling to a third level that is between said first and second levels, said drive signal remaining substantially constant at said third level for a period of time greater than it took for the drive signal to change from said first level to said third level.

20. A focus servo apparatus according to claim 19, wherein said lead-in circuit means comprises a control circuit means for generating a lead-in signal having first and second digital states and a sharp transition from the first state to the second state, and drive signal generating circuit means for differentiating the lead-in signal.

21. A focus servo apparatus according to claim 20, wherein said lead-in circuit means further comprises means for generating a bias signal, orientation detector means for detecting whether said disk has a substantially horizontal orientation, said orientation detector means including a mass that is movably mounted in response to gravity, and means for inserting said bias signal into said servo loop if said orientation detector means detects that said disk has a substantially horizontal orientation.

22. A focus servo apparatus according to claim 20, wherein said control circuit means is connected to said lead-in detection circuit means and receives said acquisition signal, wherein said control circuit means additionally comprises means for returning said lead-in signal to said first state if it has not received said acquisition signal within a predetermined time period following said sharp transition, and for thereafter providing another sharp transition from said first state to said second state, and wherein said lead-in circuit means further comprises means, responsive to a signal from said control circuit means, for inserting a bias signal into said servo loop if said control circuit means does not receive said acquisition signal within said predetermined time period.

23. A focus servo apparatus according to claim 19, wherein said lead-in circuit means comprises a control circuit means for generating a binary lead-in signal which changes from a first value to a second value and then to a third value between the first and second values, and drive signal generating circuit means for converting the binary lead-in signal to corresponding analog levels.

24. A focus servo apparatus according to claim 23, wherein said control circuit means is connected to said lead-in detection circuit means and receives said acquisition signal, and wherein said control circuit means additionally comprises means for changing said binary lead-in signal to a fourth value that is greater than said second value if said control circuit means does not receive said acquisition signal within a predetermined time period after the binary lead-in signal changed from the first value to the second value, and for thereafter changing the binary lead-in signal again to a fifth value that is smaller than the fourth value.

25. A focus servo apparatus for moving an objective lens from a distant position toward the surface of a disk in an optical disk drive and maintaining the lens in the correct position to focus a beam of light onto the surface of the disk, comprising:
a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquisition signal; and
a lead-in circuit connected to said servo loop, for generating a drive signal to move said objective lens into said range before said servo loop is closed, such that said drive signal rises to an initial peak, then falls back to a lower level, wherein said lead-in circuit includes a control circuit for generating a lead-in signal, a drive signal generating circuit for receiving said lead-in signal and processing it to create said drive signal, an orientation detecting means for detecting the mounting orientation of said disk and generating a bias switch signal that assumes one state when said orientation is substantially vertical and another state when said orientation is substantially horizontal, a bias generator for generating a bias signal, and a bias switch for receiving said bias signal and said bias switch signal, and applying said bias signal to a point in said servo loop when said bias switch signal indicates that said orientation is substantially horizontal.

26. A focus servo apparatus for moving an objective lens from a distant position toward the surface of a disk in an optical disk drive and maintaining the lens in the correct position to focus a beam of light onto the surface of the disk, comprising:

a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquisition signal; and a lead-in circuit connected to said servo loop, for generating a drive signal to move said objective lens into said range before said servo loop is closed, such that said drive signal rises to an initial peak, then falls back to a lower level, said lead-in circuit including a control circuit for generating a lead-in signal, and a drive signal generating circuit for receiving said lead-in signal and processing it to create said drive signal;

wherein said control circuit is connected to said lead-in detection circuit, and said control circuit and said drive signal generating circuit also serve as an orientation detecting means for detecting whether said disk has a substantially horizontal orientation and means for modifying said drive signal if a substantially horizontal orientation is detected, by increasing said drive signal if said control circuit does not receive said acquisition signal within a set time.

27. A focus servo apparatus for moving an objective lens from a distant position toward the surface of a disk in an optical disk drive and maintaining the lens in the correct position to focus a beam of light onto the surface of the disk, comprising:

a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquistion signal; and a lead-in circuit connected to said servo loop, for generating a drive signal to move said objective lens into said range before said servo loop is closed, such that said drive signal rises to an initial peak, then falls back to a lower level, said lead-in circuit including a control circuit for generating a lead-in signal, and a drive signal generating circuit for receiving said lead-in signal and processing it to create said drive signal;

wherein said control circuit is connected to said lead-in detection circuit and receives said acquistion signal, and said control circuit comprises means for timing a period having a set duration and, if said control circuit fails to receive said acquisition signal within said period having said set duration, for causing said drive signal generating circuit to increase the previously generated drive signal by an amount corresponding to the force of the weight load of said objective lens.

28. A focus servo apparatus for moving an objective lens from a distant position toward the surface of a disk in an optical disk drive and maintaining the lens in the correct position to focus a beam of light onto the surface of the disk, comprising:

a servo loop for maintaining said objective lens at the position of correct focus, having a lead-in detection circuit for generating an acquisition signal when said objective lens has been moved into the range in which it can be controlled by the servo loop, and a servo loop switch for closing the servo loop in response to said acquisition signal; and a lead-in circuit connected to said servo loop, for generating a drive signal to move said objective lens into said range before said servo loop is closed, such that said drive signal rises to an initial peak, then falls back to a lower level, said lead-in circuit including a control circuit for generating a lead-in signal, and a drive signal generating circuit for receiving said lead-in signal and processing it to create said drive signal;

wherein said drive signal generating circuit includes a differentiating circuit;

wherein said control circuit is connected to said lead-in detection circuit and receives said acquisition signal;

wherein said control circuit includes means for timing a period having a set duration and for causing said drive signal to rise again to a peak level and then fall back to a lower level if said acquisition signal does not arrive within said period having said set duration; and wherein before causing said drive signal to rise again to a peak level, said control circuit sets said differentiating circuit.

* * * * *